US 11,845,154 B2

United States Patent
Hashimoto et al.

(10) Patent No.: US 11,845,154 B2
(45) Date of Patent: Dec. 19, 2023

(54) PROCESSING APPARATUS

(71) Applicant: DISCO CORPORATION, Tokyo (JP)

(72) Inventors: Hiroyuki Hashimoto, Tokyo (JP); Shinya Yasuda, Tokyo (JP); Satoshi Takahashi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 395 days.

(21) Appl. No.: 16/898,787

(22) Filed: Jun. 11, 2020

(65) Prior Publication Data

US 2020/0398396 A1  Dec. 24, 2020

(30) Foreign Application Priority Data

Jun. 18, 2019 (JP) .................................. 2019-113104

(51) Int. Cl.
*B23Q 11/12* (2006.01)
*B23Q 17/09* (2006.01)
*B23Q 11/10* (2006.01)

(52) U.S. Cl.
CPC ............ *B23Q 11/127* (2013.01); *B23Q 11/10* (2013.01); *B23Q 17/0985* (2013.01); *G05B 2219/49206* (2013.01); *Y10T 409/303976* (2015.01); *Y10T 409/309352* (2015.01)

(58) Field of Classification Search
CPC ....... B23Q 17/0985; B23Q 1/70–1/706; B23Q 11/10; B23Q 11/127; B23Q 17/2433; B23Q 17/2452; G05B 2219/49206; G05B 2219/49215; B24B 49/14; B24B 55/00; B24B 41/007; Y10T 409/303976; Y10T 409/309352

USPC .................................... 409/135, 231; 451/7
See application file for complete search history.

(56) References Cited

U.S. PATENT DOCUMENTS

| | | | | |
|---|---|---|---|---|
| 6,089,797 A | * | 7/2000 | Chen ....................... | F28D 15/00 165/206 |
| 6,508,614 B1 | * | 1/2003 | Ozaki ...................... | B23Q 1/38 310/90.5 |
| 2016/0059370 A1 | * | 3/2016 | Matsuyama ......... | B23D 59/025 409/136 |

(Continued)

FOREIGN PATENT DOCUMENTS

| CN | 107716953 A | * | 2/2018 | ............... B23Q 1/70 |
|---|---|---|---|---|
| DE | 3016136 A | * | 10/1981 | ........... B23Q 11/127 |

(Continued)

*Primary Examiner* — Sunil K Singh
*Assistant Examiner* — Michael Vitale
(74) *Attorney, Agent, or Firm* — Greer Burns & Crain Ltd.

(57) ABSTRACT

A processing apparatus includes a processing unit, a control unit, and a temperature detecting unit. The processing unit includes a cutting blade and a spindle assembly, the spindle assembly including a spindle having the cutting blade mounted on a distal end of the spindle and a spindle housing through which the spindle is inserted. A cooling fluid passage is formed in the spindle housing, the cooling fluid passage cooling the spindle assembly, and having one end connected to a cooling fluid supply source and having another end communicating with a cooling fluid outlet of the spindle housing. The temperature detecting unit detects the temperature of the spindle housing. The control unit determines whether a state of cooling of the spindle assembly is normal or abnormal on the basis of the temperature detected by the temperature detecting unit.

8 Claims, 9 Drawing Sheets

(56) References Cited

U.S. PATENT DOCUMENTS

| | | | | |
|---|---|---|---|---|
| 2018/0043491 A1* | 2/2018 | Nakamura | ............... | B23Q 5/10 |
| 2019/0054583 A1* | 2/2019 | Dirscherl | ................ | B23B 47/34 |
| 2020/0316735 A1* | 10/2020 | Murota | ................ | F16C 41/005 |

FOREIGN PATENT DOCUMENTS

| | | | | | |
|---|---|---|---|---|---|
| DE | 202012003528 U1 | * | 7/2012 | ........... | B23Q 11/127 |
| JP | 04-002441 A | * | 1/1992 | | |
| JP | 04128145 U | | 11/1992 | | |
| JP | H0719236 A | * | 1/1995 | ........... | B23Q 11/127 |
| JP | 2003011036 A | * | 1/2003 | ........... | B23Q 11/127 |
| JP | 2004338034 A | * | 12/2004 | | |
| JP | 3845757 B2 | * | 11/2006 | | |
| JP | 2011214605 A | | 10/2011 | | |

* cited by examiner

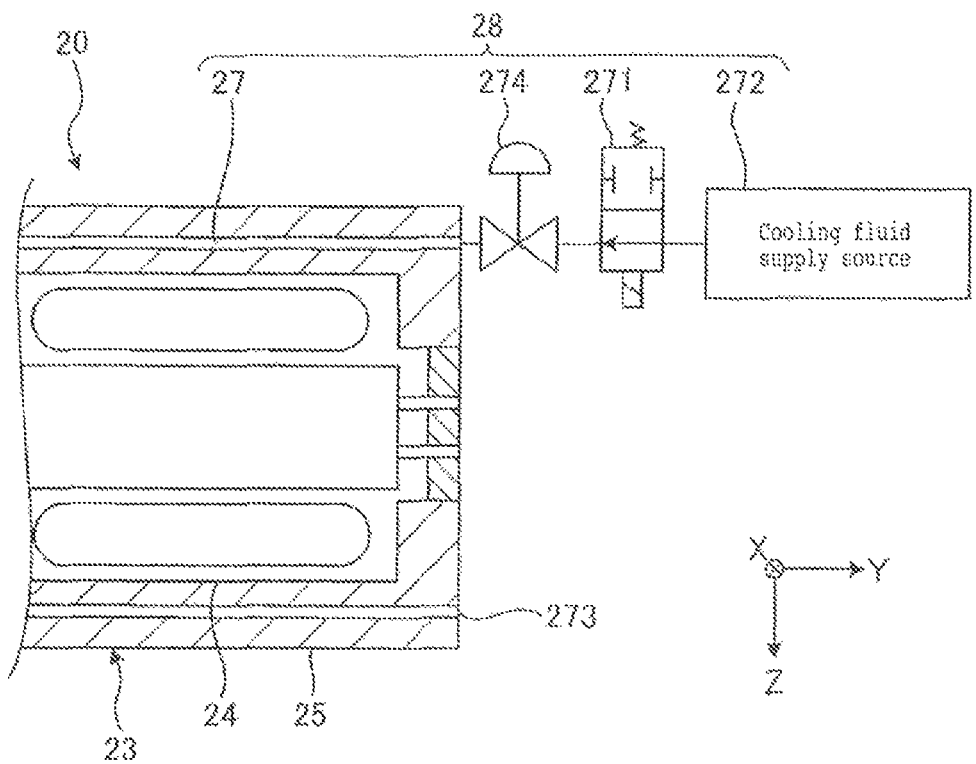

PROCESSING APPARATUS

BACKGROUND OF THE INVENTION

Field of the Invention

The present invention relates to a processing apparatus including a spindle assembly.

Description of the Related Art

A processing apparatus such as a cutting apparatus that cuts a workpiece, a grinding apparatus that grinds a workpiece, or the like includes a spindle assembly mounted with a processing tool (see Japanese Patent Laid-Open No. 2011-214605 and Japanese Utility Model Laid-Open No. H04-128145, for example). The spindle assembly has a cooling fluid passage formed in a spindle housing, the cooling fluid passage cooling a spindle (shaft) rotatably supported by an air bearing. In the spindle assembly, the spindle and the like are cooled by supplying a cooling fluid from a cooling fluid supply source to the cooling fluid passage via a valve.

SUMMARY OF THE INVENTION

However, the above-described spindle assembly is heated by heat generation of the spindle and the like when cooling water is not supplied because of a failure of the valve, clogging of the cooling fluid passage due to foreign matter mixed in the cooling water, or the like. When the above-described spindle assembly is heated, the position of the processing tool mounted on a distal end of the spindle is changed by thermal expansion. Thus, precise control of a processing position becomes difficult, so that processing accuracy is decreased.

It is accordingly an object of the present invention to provide a processing apparatus that can suppress a decrease in processing accuracy.

In accordance with an aspect of the present invention, there is provided a processing apparatus including a processing unit configured to process a workpiece, a control unit configured to control the processing unit, and a temperature detecting unit. The processing unit includes a processing tool configured to process the workpiece, and a spindle assembly including a spindle having the processing tool mounted on a distal end of the spindle and a spindle housing through which the spindle is inserted, the spindle housing having an air bearing configured to support the spindle by air. A cooling fluid passage is formed in the spindle housing, the cooling fluid passage surrounding the air bearing and cooling the spindle assembly, the cooling fluid passage having one end connected to a cooling fluid supply source and having another end communicating with a cooling fluid outlet of the spindle housing. The temperature detecting unit detects a temperature of the spindle housing, and the control unit determines whether a state of cooling of the spindle assembly is normal or abnormal on the basis of the temperature detected by the temperature detecting unit.

In the processing apparatus, the control unit may determine that the state of cooling of the spindle assembly is abnormal when the temperature of the spindle housing, the temperature being detected by the temperature detecting unit, is equal to or higher than a predetermined value or equal to or lower than a predetermined value.

In the processing apparatus, the control unit may determine that the state of cooling of the spindle assembly is abnormal when a change in the temperature of the spindle housing, the temperature being detected by the temperature detecting unit, in a fixed time is equal to or more than a predetermined value.

The processing apparatus may further include a moving unit configured to move the processing tool with respect to the workpiece, and the control unit may correct a position of the processing tool with respect to the workpiece by the moving unit on the basis of a change in the temperature of the spindle housing, the temperature being detected by the temperature detecting unit.

The processing apparatus may further include a flow rate regulating unit configured to regulate a flow rate of a cooling fluid supplied from the cooling fluid supply source, and the control unit may control the flow rate regulating unit on the basis of the temperature of the spindle housing, the temperature being detected by the temperature detecting unit.

The present invention produces an effect of being able to suppress a decrease in processing accuracy.

The above and other objects, features and advantages of the present invention and the manner of realizing them will become more apparent, and the invention itself will best be understood from a study of the following description and appended claims with reference to the attached drawings showing preferred embodiments of the invention.

BRIEF DESCRIPTION OF THE DRAWINGS

FIG. 8 is a side view illustrating in partial section principal parts of a processing unit of a processing apparatus according to a third embodiment;

FIG. 9 is a diagram illustrating an example of correction data stored by a control unit of the processing apparatus according to the third embodiment;

DETAILED DESCRIPTION OF THE PREFERRED EMBODIMENTS

Modes for carrying out the present invention (embodiments) will be described in detail with reference to the drawings. The present invention is not limited by contents described in the following embodiments. In addition, constituent elements to be described in the following include constituent elements readily conceivable by those skilled in the art and essentially identical constituent elements. Further, configurations to be described in the following can be combined with each other as appropriate. In addition, various omissions, replacements, or modifications of configurations can be performed without departing from the spirit of the present invention.

First Embodiment

Figure 1:
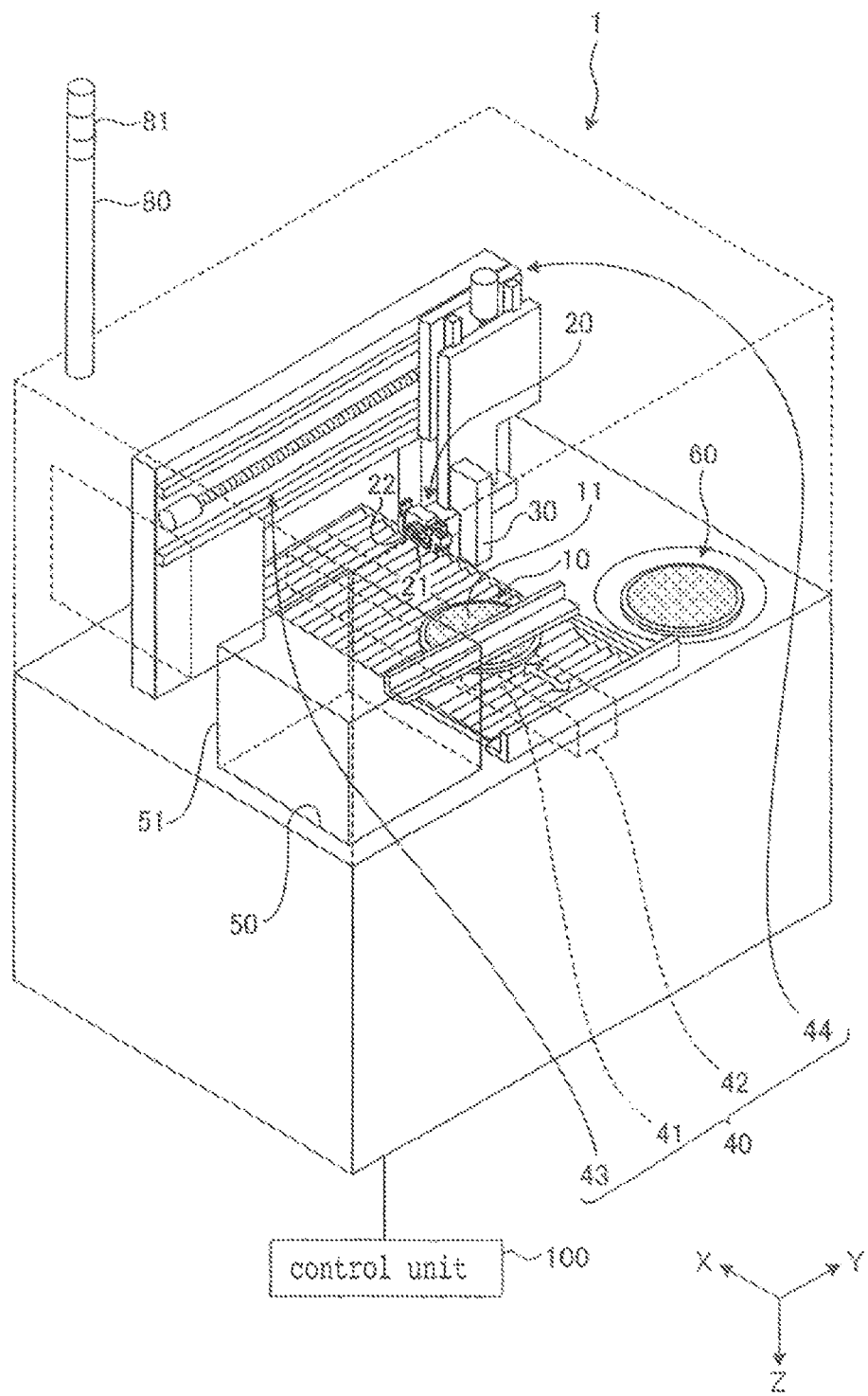
FIG. 1 is a perspective view illustrating an example of a configuration of a processing apparatus according to a first embodiment.
Figure 2:
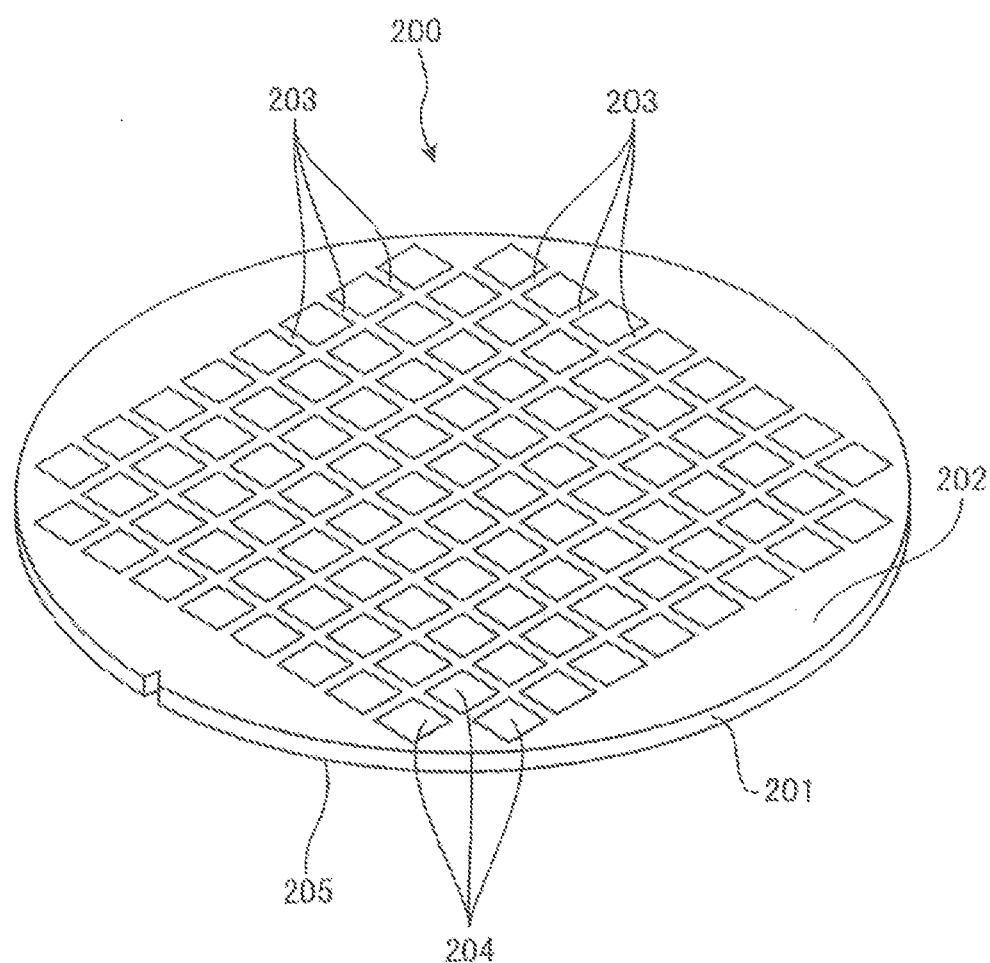
FIG. 2 is a perspective view illustrating a workpiece as a processing target of the processing apparatus illustrated in FIG. 1.
Figure 3:
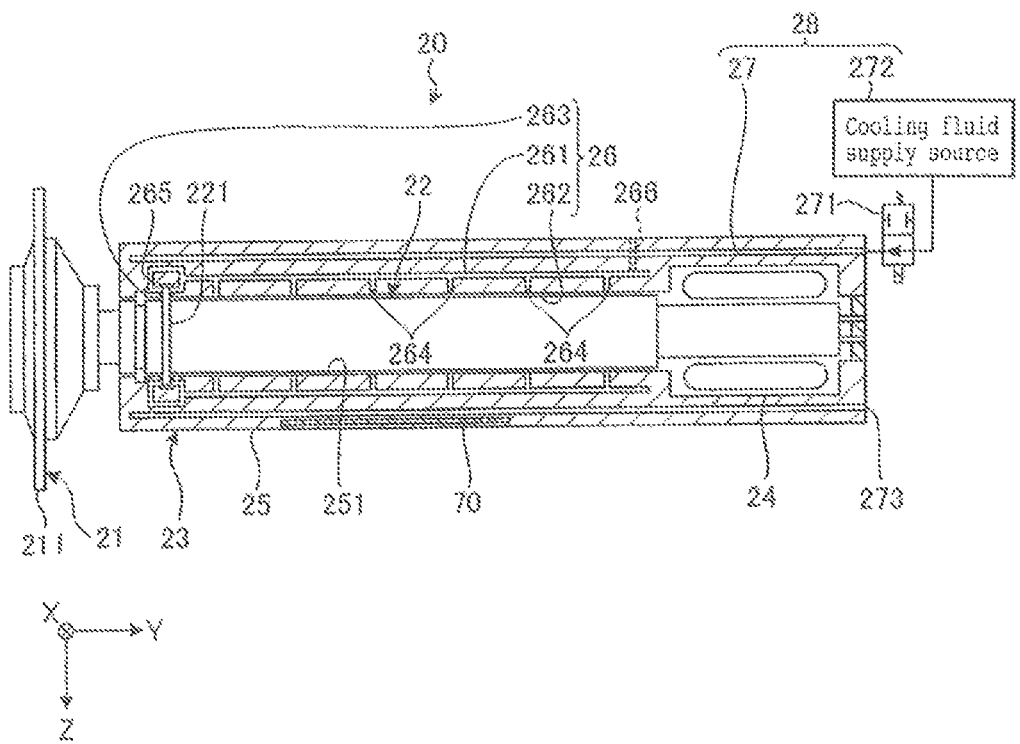
FIG. 3 is a side view illustrating in partial section a processing unit of the processing apparatus illustrated in FIG. 1.
Figure 4:
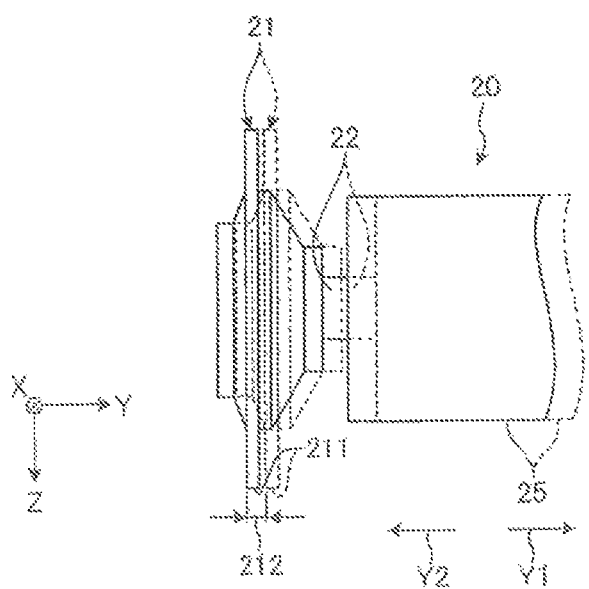
FIG. 4 is a fragmentary side view illustrating a state when the temperature of a spindle housing of the processing unit illustrated in FIG. 3 is changed.
Figures 5, 6:
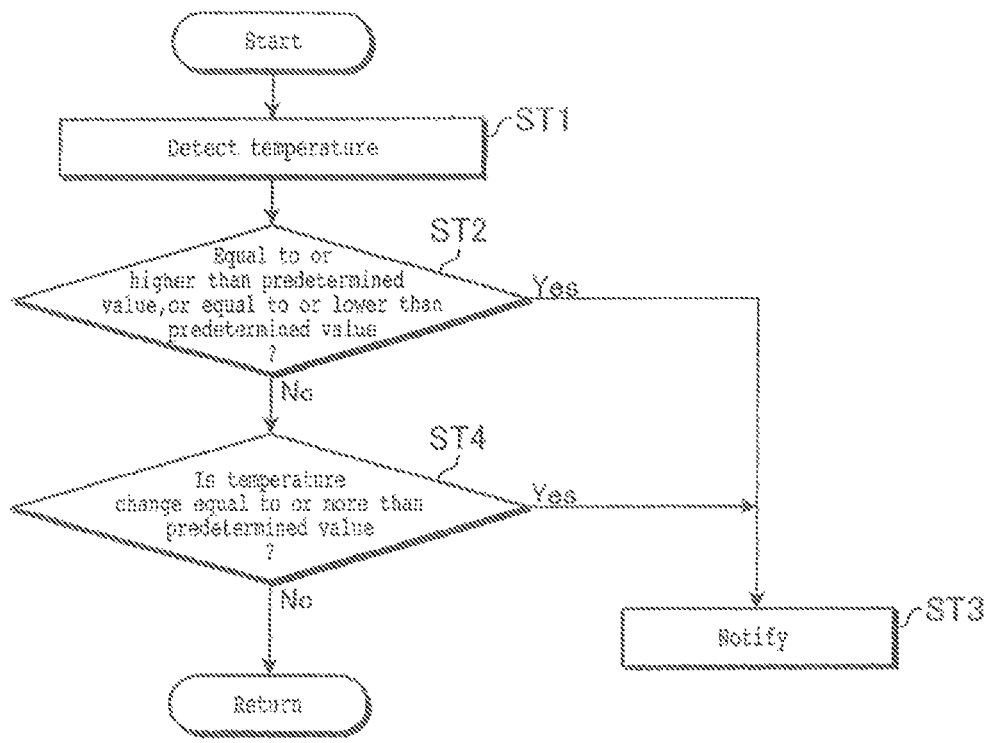
FIG. 5 is a flowchart showing a control operation repeatedly executed by a control unit of the processing apparatus illustrated in FIG. 1 during processing operation.
FIG. 6 is a diagram illustrating an example of correction data stored by a control unit of a processing apparatus according to a second embodiment.

A processing apparatus according to the first embodiment of the present invention will be described with reference to drawings. FIG. 1 is a perspective view illustrating an example of a configuration of the processing apparatus according to the first embodiment. FIG. 2 is a perspective view illustrating a workpiece as a processing target of the processing apparatus illustrated in FIG. 1. FIG. 3 is a side view illustrating in partial section a processing unit of the processing apparatus illustrated in FIG. 1. FIG. 4 is a fragmentary side view illustrating a state when the temperature of a spindle housing of the processing unit illustrated in FIG. 3 is changed. FIG. 5 is a flowchart showing a control operation repeatedly executed by a control unit of the processing apparatus illustrated in FIG. 1 during processing operation.

Workpiece

The processing apparatus 1 illustrated in FIG. 1 according to the first embodiment is a cutting apparatus that performs cutting of the workpiece 200 illustrated in FIG. 2 by a cutting blade 21 (which cutting corresponds to processing). In the first embodiment, the workpiece 200 is a wafer such as a disk-shaped semiconductor wafer, an optical device wafer, or the like including silicon, sapphire, gallium, or the like as a substrate 201. The workpiece 200 has devices 204 formed in regions demarcated in a lattice manner by a plurality of planned dividing lines 203 formed in a lattice manner on a front side surface 202 of the substrate 201.

In addition, the workpiece 200 in the present invention may be a so-called TAIKO (registered trademark) wafer whose central portion is thinned and which has a thick part formed as an outer circumferential portion of the wafer. The workpiece 200 may be not only a wafer but also a rectangular package substrate having a plurality of devices sealed by a resin, a ceramic substrate on which the devices 204 and the planned dividing lines 203 are not set, a ferrite substrate, a glass plate, a substrate including at least one of nickel and iron, or the like. In the first embodiment, the workpiece 200 is supported by an annular frame by affixing a reverse side surface 205 of the workpiece 200 to an adhesive tape having the annular frame fitted to an outer peripheral edge thereof, and the workpiece 200 is cut by the processing apparatus 1 illustrated in FIG. 1.

Processing Apparatus

The processing apparatus 1 illustrated in FIG. 1 is a cutting apparatus that performs cutting of the workpiece 200 (which cutting corresponds to processing). As illustrated in FIG. 1, the processing apparatus 1 includes at least: a chuck table 10 that sucks and holds the workpiece 200 by a holding surface 11; a processing unit 20 as processing means for cutting the workpiece 200 held on the chuck table 10 by a cutting blade 21 as a processing tool mounted on a spindle (shaft) 22; an imaging unit 30 that images the workpiece 200 held on the chuck table 10; a moving unit 40 as moving means for moving the chuck table 10 and the processing unit 20 relative to each other; and a control unit 100 as control means for controlling at least the processing unit 20.

The moving unit 40 is moving means for moving the cutting blade 21 with respect to the workpiece 200. The moving unit 40 includes at least: a rotation driving source 41 that rotates the chuck table 10 about an axis parallel with a Z-axis direction parallel with a vertical direction; an X-axis moving unit 42 that processing-feeds the chuck table 10 in an X-axis direction parallel with a horizontal direction; a Y-axis moving unit 43 that indexing-feeds the processing unit 20 in a Y-axis direction parallel with the horizontal direction and orthogonal to the X-axis direction; and a Z-axis moving unit 44 that cutting-feeds the processing unit 20 in the Z-axis direction.

The chuck table 10 is a disk-shaped plate whose holding surface 11 holding the workpiece 200 is formed of a porous ceramic or the like. In addition, the chuck table 10 is disposed so as to be movable in the X-axis direction by the X-axis moving unit 42 and rotatable about an axis parallel with the Z-axis direction by the rotation driving source 41. The holding surface 11 of the chuck table 10, the holding surface 11 being formed of a porous ceramic or the like, is connected to a vacuum suction source not illustrated. The workpiece 200 integral with the annular frame is mounted on the holding surface 11 of the chuck table 10 via an adhesive tape 231, and the chuck table 10 sucks and holds the workpiece 200 integral with the annular frame when the holding surface 11 is sucked by the vacuum suction source. In addition, a clamp unit not illustrated, which clamps the annular frame, is provided around the chuck table 10.

The processing unit 20 is a unit rotatably fitted with the cutting blade 21 that cuts the workpiece 200 held on the chuck table 10. The processing unit 20 is provided so as to be movable in the Y-axis direction by the Y-axis moving unit 43 and movable in the Z-axis direction by the Z-axis moving unit 44 with respect to the workpiece 200 held on the chuck table 10. The processing unit 20 can position the cutting blade 21 at an arbitrary position of the holding surface 11 of the chuck table 10 by the Y-axis moving unit 43 and the Z-axis moving unit 44.

As illustrated in FIG. 3, the processing unit 20 includes the cutting blade 21 cutting the workpiece 200 and a spindle assembly 23. The cutting blade 21 is a cutting grindstone having a ring-shaped very thin cutting edge 211 formed by fixing abrasive grains with a bonding agent.

The spindle assembly 23 includes: a spindle 22 having the cutting blade 21 mounted on a distal end thereof; a spindle motor 24 that rotates the spindle 22 about an axis; and a spindle housing 25 that houses a part of the spindle 22 excluding the distal end of the spindle 22 and the spindle motor 24.

The spindle 22 is formed in a cylindrical shape. A distal end portion of the spindle 22 which distal end portion is housed in the spindle housing 25 is provided with a ring-shaped thrust plate 221. The spindle 22 is rotated about the axis by the spindle motor 24 disposed at a proximal end portion of the spindle 22. By being rotated about the axis by the spindle motor 24, the spindle 22 rotates the cutting blade 21 mounted on the distal end of the spindle 22 to cut the workpiece 200.

The spindle housing 25 exposes the distal end of the spindle 22 and houses the part of the spindle 22 excluding the distal end of the spindle 22. The spindle 22 is thus inserted in the spindle housing 25. The spindle housing 25 is supported by the Y-axis moving unit 43 so as to be movable in the Y-axis direction, and is supported by the Z-axis moving unit 44 so as to be movable in the Z-axis direction.

The spindle housing 25 has an internally formed housing hole 251 housing the part of the spindle 22 excluding the distal end of the spindle 22, the housing hole 251 having a circular sectional shape orthogonal to the axis. The inside diameter of the housing hole 251 of the spindle housing 25 is larger than the outside diameter of the spindle 22. The spindle housing 25 includes an air bearing 26 that supports the spindle 22 rotatably about the axis.

The air bearing 26 is disposed on the outer circumferential side of the housing hole 251 and within the spindle housing 25, and includes an annular air supply passage 261 extending in the axial direction of the spindle housing 25, a radial air bearing 262, and a thrust air bearing 263. The annular air supply passage 261 is supplied with a pressurized air from a pressurized air supply source on the outside of the spindle housing 25 through an air supply passage 266.

The radial air bearing 262 is formed by a plurality of radial branch passages 264 opening to the annular air supply passage 261 and the inner surface of the housing hole 251. The radial branch passages 264 are arranged at equal intervals in the axial direction and circumferential direction of the spindle housing 25, and extend in the radial direction of the spindle housing 25 from the annular air supply passage 261 to the inner surface of the housing hole 251.

The thrust air bearing 263 includes a thrust branch passage 265 connected to the annular air supply passage 261 and supplying the pressurized air supplied from the pressurized air supply source to both surfaces and the outer circumferential surface of the thrust plate 221. The radial air bearing 262 jets the pressurized air supplied from the pressurized air supply source to the inner surface of the housing hole 251 through the radial branch passages 264, and the thrust air bearing 263 jets the pressurized air to the thrust plate 221 through the thrust branch passage 265. The air bearing 26 thereby supports the spindle 22 rotatably about the axis with respect to the spindle housing 25 by air.

In addition, a cooling fluid passage 27 surrounding the air bearing 26 is formed in the spindle housing 25. The cooling fluid passage 27 is disposed on the outer circumferential side of the annular air supply passage 261 of the air bearing 26 and within the spindle housing 25, and extends in the axial direction of the spindle housing 25. The cooling fluid passage 27 has one end connected to a cooling fluid supply source 272 supplying cooling water as a cooling fluid via an opening and closing valve 271, and has another end communicating with a cooling fluid outlet 273 opening to the external surface of the spindle housing 25.

The cooling fluid passage 27 is supplied with the cooling water from the cooling fluid supply source 272 via the opening and closing valve 271, the cooling water is heated by heat generated in the spindle housing 25, and the heated cooling water is discharged from the cooling fluid outlet 273. The spindle assembly 23 is thereby cooled. Incidentally, the cooling fluid passage 27, the opening and closing valve 271, and the cooling fluid supply source 272 constitute a cooling unit 28 as cooling means for cooling the spindle assembly 23.

In addition, as illustrated in FIG. 3, the processing apparatus 1 includes a temperature detecting unit (temperature detecting means) 70. The temperature detecting unit 70 detects the temperature of the spindle housing 25. The temperature detecting unit 70 in the first embodiment is a temperature detecting element that outputs a signal corresponding to the temperature of the spindle housing 25 to the control unit 100. The temperature detecting unit 70 in the first embodiment is formed by a temperature detecting element such as a thermistor, a thermocouple, or the like. Incidentally, the thermistor outputs the above-described signal based on a change in an electric resistance value according to the temperature of the spindle housing 25 to the control unit 100. The thermocouple outputs a thermoelectromotive force corresponding to the temperature of the spindle housing 25 as the above-described signal to the control unit 100. In the first embodiment, the temperature detecting unit 70 is disposed between the external surface of the spindle housing 25 and the cooling fluid passage 27. However, in the present invention, the position in which the temperature detecting unit 70 is disposed is not limited to this, but the temperature detecting unit 70 may be disposed on the external surface of the spindle housing 25, for example. In addition, the temperature detecting unit 70 is preferably disposed in a position as close to the cutting blade 21 as possible in the spindle housing 25.

Incidentally, the axes of the cutting blade 21, the spindle 22, and the spindle housing 25 of the processing unit 20 are set parallel with the Y-axis direction.

The imaging unit 30 is fixed to the processing unit 20 so as to move integrally with the processing unit 20. The imaging unit 30 includes an imaging element that photographs a region to be divided in the workpiece 200 held on the chuck table 10 before cutting. The imaging element is, for example, a charge-coupled device (CCD) imaging element or a complementary metal-oxide semiconductor (CMOS) imaging element. The imaging unit 30 obtains an image for, for example, carrying out alignment that performs positioning between the workpiece 200 and the cutting blade 21 by photographing the workpiece 200 held on the chuck table 10. The imaging unit 30 outputs the obtained image to the control unit 100.

The X-axis moving unit 42 processing-feeds the chuck table 10 and the processing unit 20 relative to each other along the X-axis direction by moving the chuck table 10 in the X-axis direction. The Y-axis moving unit 43 indexing-feeds the chuck table 10 and the processing unit 20 relative to each other along the Y-axis direction by moving the processing unit 20 in the Y-axis direction as an indexing feed direction. The Z-axis moving unit 44 cutting-feeds the chuck table 10 and the processing unit 20 relative to each other along the Z-axis direction by moving the processing unit 20 in the Z-axis direction as a cutting feed direction.

The X-axis moving unit 42, the Y-axis moving unit 43, and the Z-axis moving unit 44 include a well-known ball screw provided rotatably about an axis, a well-known motor rotating the ball screw about the axis, and well-known guide rails supporting the chuck table 10 or the processing unit 20 movably in the X-axis direction, the Y-axis direction, or the Z-axis direction.

In addition, the processing apparatus 1 includes an X-axis direction position detecting unit not illustrated for detecting the position in the X-axis direction of the chuck table 10, a Y-axis direction position detecting unit not illustrated for detecting the position in the Y-axis direction of the processing unit 20, and a Z-axis direction position detecting unit for detecting the position in the Z-axis direction of the processing unit 20. The X-axis direction position detecting unit and the Y-axis direction position detecting unit can be formed by a linear scale parallel with the X-axis direction or the Y-axis direction and a read head. The Z-axis direction position detecting unit detects the position in the Z-axis direction of the processing unit 20 on the basis of motor pulses. The X-axis direction position detecting unit, the Y-axis direction position detecting unit, and the Z-axis direction position detecting unit output the position in the X-axis direction of the chuck table 10 or in the Y-axis direction or the Z-axis direction of the processing unit 20 to the control unit 100.

In addition, the processing apparatus 1 includes: a cassette elevator 50 that is mounted with a cassette 51 housing the workpiece 200 before and after cutting and which moves the cassette 51 in the Z-axis direction; a cleaning unit 60 that cleans the workpiece 200 after cutting; and a transfer unit not illustrated which transfers the workpiece 200 between the cassette 51, the chuck table 10, and the cleaning unit 60.

The control unit 100 makes the processing apparatus 1 perform processing operation on the workpiece 200 by controlling each of the above-described constituent elements of the processing apparatus 1. Incidentally, the control unit 100 is a computer. The control unit 100 includes an arithmetic processing apparatus having a microprocessor such as a central processing unit (CPU) or the like, a storage apparatus having a memory such as a read only memory (ROM), a random access memory (RAM), or the like, and an input-output interface apparatus. The arithmetic processing apparatus of the control unit 100 performs arithmetic processing according to a computer program stored in the storage apparatus, and outputs a control signal for controlling the processing apparatus 1 to the above-described constituent elements of the processing apparatus 1 via the input-output interface apparatus.

In addition, the control unit 100 is connected with a display unit not illustrated, which is formed by a liquid crystal display apparatus or the like displaying the state of the processing operation, an image, or the like, an input unit not illustrated, which is used when an operator registers processing content information or the like, and a notifying unit 80 notifying the operator of the processing apparatus. The input unit is formed by at least one of a touch panel provided to the display unit and an external input apparatus such as a keyboard or the like. In the first embodiment, the notifying unit 80 is an indicator light that lights a lamp 81 by being controlled by the control unit 100, and thus notifies the operator of the processing apparatus 1. Incidentally, in the present invention, the notifying unit 80 may notify the operator by emitting a notifying sound.

In the above-described processing apparatus 1, the control unit 100 receives processing content information via the input unit, and stores the processing content information in the storage apparatus. The processing apparatus 1 starts the processing operation when the cassette 51 housing workpieces 200 is placed on the cassette elevator 50 and a processing start instruction is received from the input unit. Incidentally, the processing content information includes information indicating the position in the Y-axis direction of each of the planned dividing lines 203 to be cut by the cutting blade 21. In the processing operation, the processing apparatus 1 opens the opening and closing valve 271, supplies the cooling water from the cooling fluid supply source 272 to the cooling fluid passage 27, and rotates the spindle 22 and the cutting blade 21 about the axis by the spindle motor 24 while the processing apparatus 1 supplies the pressurized air from the pressurized air supply source to the annular air supply passage 261 and the air bearings 262 and 263 through the air supply passage 266.

In the processing operation, the processing apparatus 1 extracts one workpiece 200 before cutting from the cassette 51, places the workpiece 200 on the holding surface 11 of the chuck table 10 by the transfer unit, and sucks and holds the workpiece 200 on the chuck table 10. In the processing operation, the processing apparatus 1 makes the X-axis moving unit 42 move the chuck table 10, makes the imaging unit 30 image the workpiece 200 on the chuck table 10, and carries out alignment that performs positioning between a planned dividing line 203 of the workpiece 200 and the cutting blade 21.

In the processing operation, the processing apparatus 1 cuts the workpiece 200 by making the cutting blade 21 cut into the planned dividing line 203 while moving the workpiece 200 held on the chuck table 10 and the cutting blade 21 relative to each other along the planned dividing line 203. After the processing apparatus 1 performs cutting in all of the planned dividing lines 203, the processing apparatus 1 releases the sucking and holding of the chuck table 10 and the clamping of the clamp unit, and makes the transfer apparatus transfer the workpiece 200 on the chuck table 10 to the cleaning unit 60. The processing apparatus 1 makes the cleaning unit 60 clean the workpiece 200, and makes the transfer apparatus transfer the workpiece 200 from the cleaning unit 60 to the cassette 51 and carry the workpiece 200 into the cassette 51. The processing apparatus 1 ends the processing operation when the processing apparatus 1 has performed cutting in all of the workpieces 200 within the cassette 51.

When the temperature of the spindle assembly 23 of the processing unit 20 changes during the processing operation of the processing apparatus 1, the position in the Y-axis direction of the cutting edge 211 of the cutting blade 21 changes due to expansion or contraction of the spindle 22 or the like, as illustrated in FIG. 4. In the first embodiment, when the temperature of the spindle assembly 23 of the processing unit 20 rises by 1° C., for example, the position of the cutting edge 211 of the cutting blade 21 changes from a position indicated by a dotted line in FIG. 4 to a position indicated by a solid line in FIG. 4. In the first embodiment, when the temperature of the spindle assembly 23 of the processing unit 20 drops by 1° C., the position of the cutting edge 211 of the cutting blade 21 changes from the position indicated by the solid line in FIG. 4 to the position indicated by the dotted line in FIG. 4. In the first embodiment, an amount of change 212 in the position in the Y-axis direction of the cutting blade 21 when the temperature of the spindle assembly 23 of the processing unit 20 changes by 1° C. is 1 µm. Therefore, the processing apparatus 1 according to the first embodiment is decreased in processing accuracy when the temperature of the spindle assembly 23 changes, that is, when an abnormality occurs in the state of cooling of the spindle assembly 23 by the cooling unit 28.

The control unit 100 of the processing apparatus 1 repeatedly executes the control operation shown by the flowchart illustrated in FIG. 5 during the processing operation of the processing apparatus 1. The control unit 100 detects (calculates) the temperature of the spindle housing 25 from a signal corresponding to the temperature of the spindle housing 25 from the temperature detecting unit 70, and stores the temperature of the spindle housing 25 in the storage apparatus in association with time (step ST1). The control unit 100 determines whether or not the temperature of the spindle housing 25 which temperature is detected by the temperature detecting unit 70 and the like in step ST1 is equal to or higher than a first predetermined value or equal to or lower than a second predetermined value lower than the first predetermined value (step ST2).

When the control unit 100 determines that the temperature of the spindle housing 25 which temperature is detected by the temperature detecting unit 70 and the like in step ST1 is equal to or higher than the first predetermined value or equal to or lower than the second predetermined value lower than the first predetermined value (step ST2: Yes), the control unit 100 determines that an abnormality has occurred in the cooling state of the cooling unit 28, notifies the operator that there is an abnormality by making the notifying unit 80 light the lamp 81, makes display to the effect that there is an abnormality on the display unit, and temporarily stops the processing operation (step ST3).

When the control unit 100 determines that the temperature of the spindle housing 25 which temperature is detected by the temperature detecting unit 70 and the like in step ST1 is not equal to or higher than the first predetermined value or not equal to or lower than the second predetermined value lower than the first predetermined value (step ST2: No), the control unit 100 refers to the temperature of the spindle housing 25 which temperature is detected by the temperature detecting unit 70 and the like and stored in the storage apparatus in association with time, and determines whether or not a change in the temperature of the spindle housing 25 which temperature is detected by the temperature detecting unit 70 and the like in a fixed time (predetermined period of time) is equal to or more than a third predetermined value (step ST4).

When the control unit 100 determines that the change in the temperature of the spindle housing 25 which temperature is detected by the temperature detecting unit 70 and the like in the fixed time is equal to or more than the third predetermined value (step ST4: Yes), the control unit 100 determines that an abnormality has occurred in the cooling state of the cooling unit 28, notifies the operator that there is an abnormality by making the notifying unit 80 light the lamp 81, makes display to the effect that there is an abnormality on the display unit, and temporarily stops the processing operation (step ST3). When the control unit 100 determines that the change in the temperature of the spindle housing 25 which temperature is detected by the temperature detecting unit 70 and the like in the fixed time is not equal to or more than the third predetermined value (step ST4: No), the control unit 100 returns the control operation to step ST1.

Thus, in step ST2 and step ST4, the control unit 100 determines whether the state of cooling of the spindle assembly 23 is normal or abnormal on the basis of the temperature of the spindle housing 25 which temperature is detected by the temperature detecting unit 70.

Incidentally, the first predetermined value, the second predetermined value, the third predetermined value, and the fixed time are determined as appropriate from processing accuracy required in the cutting of the workpiece 200 or the like, and are stored as processing content information in the storage apparatus of the control unit 100. For example, the first predetermined value is 30° C., the second predetermined value is 15° C., the third predetermined value is 1° C., and the fixed time is 1 minute.

As described above, the processing apparatus 1 according to the first embodiment includes the temperature detecting unit 70 that detects the temperature of the spindle housing 25, and determines whether the state of cooling of the spindle assembly 23 is normal or abnormal on the basis of the temperature detected by the temperature detecting unit 70. The processing apparatus 1 can therefore temporarily stop the processing operation when the cooling state is abnormal. Hence, the processing apparatus 1 can suppress a decrease in processing accuracy.

In addition, when the control unit 100 determines that the temperature of the spindle housing 25 is equal to or higher than the first predetermined value or equal to or lower than the second predetermined value, the processing apparatus 1 determines that an abnormality has occurred in the cooling state of the cooling unit 28, and temporarily stops the processing operation. The processing apparatus 1 can therefore suppress a decrease in processing accuracy by stopping the processing operation when the state of cooling of the spindle assembly 23 is abnormal.

In addition, when the control unit 100 determines that the change in the temperature of the spindle housing 25 which temperature is detected by the temperature detecting unit 70 and the like in the fixed time is equal to or more than the third predetermined value, the processing apparatus 1 determines that an abnormality has occurred in the cooling state of the cooling unit 28, and temporarily stops the processing operation. The processing apparatus 1 can therefore suppress a decrease in processing accuracy by stopping the processing operation when the state of cooling of the spindle assembly 23 is abnormal.

Second Embodiment

Figure 7:
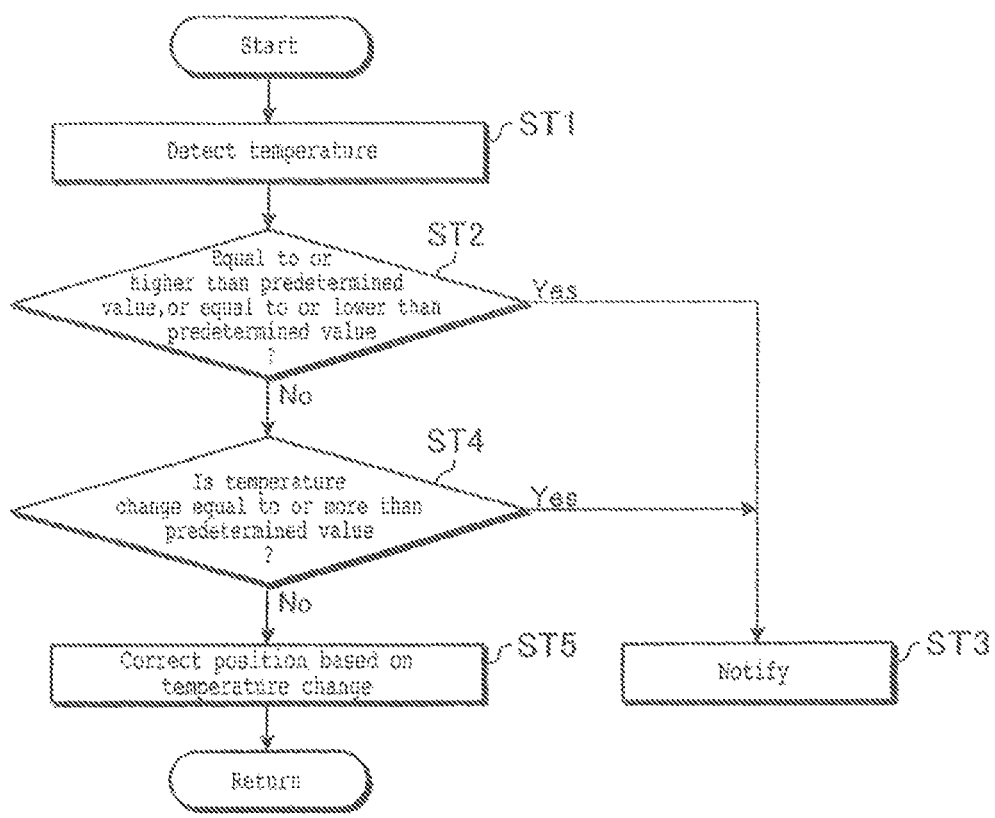
FIG. 7 is a flowchart showing a control operation repeatedly executed by the control unit of the processing apparatus according to the second embodiment during processing operation.

A processing apparatus according to a second embodiment of the present invention will be described with reference to drawings. FIG. 6 is a diagram illustrating an example of correction data stored by a control unit of the processing apparatus according to the second embodiment. FIG. 7 is a flowchart showing a control operation repeatedly executed by the control unit of the processing apparatus according to the second embodiment during processing operation. Incidentally, in FIG. 7, the same parts as in the first embodiment are identified by the same reference numerals, and description thereof will be omitted.

The processing apparatus 1 according to the second embodiment is the same as in the first embodiment except that the control unit 100 stores a reference temperature associated with information indicating the positions in the Y-axis direction of the planned dividing lines 203 and correction data 300 illustrated in FIG. 6 as processing content information, and except that the control operation shown by the flowchart illustrated in FIG. 7 which control operation is repeatedly executed by the control unit 100 during the processing operation is partly different. The reference temperature is a temperature of the spindle housing 25 at which temperature a desired position of each planned dividing line 203 can be cut when the cutting blade 21 is positioned according to information indicating the position in the Y-axis direction of each planned dividing line 203 which information is stored as the processing content information.

The correction data 300 illustrated in FIG. 6 is data obtained by associating, on a one-to-one basis, a temperature difference of the temperature of the spindle housing 25 which temperature is detected by the temperature detecting unit 70 from the reference temperature with a correction value for the position in the Y-axis direction of the cutting blade 21. The correction value indicates a distance from the position in the Y-axis direction of each planned dividing line 203 which position is stored as the processing content information to the position in the Y-axis direction of the cutting blade 21 at which position a desired position of each planned dividing line 203 can be cut. That is, the correction value is a value added to the position in the Y-axis direction of each planned dividing line 203 which position is stored as the processing content information in order to cut the desired position of each planned dividing line 203 when the spindle 22 expands or contracts due to a temperature change from the reference temperature. Incidentally, a minus sign of the correction value illustrated in FIG. 6 indicates a position on an arrow Y1 side in FIG. 4 from the position in the Y-axis direction of each planned dividing line 203 which position is stored as the processing content information, and a plus sign of the correction value illustrated in FIG. 6 indicates a position on an arrow Y2 side in FIG. 4 from the position in the Y-axis direction of each planned dividing line 203 which position is stored as the processing content information.

The control unit 100 of the processing apparatus 1 according to the second embodiment repeatedly executes the control operation shown by the flowchart illustrated in FIG. 7 during the processing operation. When the control unit 100 determines that a change in the temperature of the spindle housing 25 which temperature is detected by the temperature detecting unit 70 and the like in the fixed time is not equal to or more than the third predetermined value (step ST4: No), the control unit 100 corrects the position in the Y-axis direction of the cutting blade 21 according to the correction data 300 illustrated in FIG. 6 on the basis of the change in the temperature of the spindle housing 25, performs the processing operation (step ST5), and returns the control operation to step ST1.

Specifically, the control unit 100 refers to the correction data 300, obtains a temperature difference between the reference temperature and the temperature of the spindle housing 25 which temperature is detected by the temperature detecting unit 70, and extracts a correction value associated with the temperature difference. Incidentally, when the obtained temperature difference is not set in the correction data 300, the control unit 100 may extract a correction value associated with a closest temperature difference, or may obtain a correction value from two correction values associated with two closest temperature differences. The control unit 100 performs the processing operation after correcting the position in the Y-axis direction of the cutting blade 21 by the Y-axis moving unit 43 according to the correction value with respect to the information indicating the position in the Y-axis direction of each planned dividing line which information is stored as the processing content information.

Thus, in the second embodiment, the control unit 100 corrects the position of the cutting blade 21 with respect to the workpiece 200 by the moving unit 40 on the basis of a change in the temperature of the spindle housing 25 which temperature is detected by the temperature detecting unit 70.

The processing apparatus 1 according to the second embodiment includes the temperature detecting unit 70 that detects the temperature of the spindle housing 25, and determines whether the state of cooling of the spindle assembly 23 is normal or abnormal on the basis of the temperature detected by the temperature detecting unit 70. The processing apparatus 1 can therefore temporarily stop the processing operation when the cooling state is abnormal. Hence, the processing apparatus 1 can suppress a decrease in processing accuracy.

In addition, the processing apparatus 1 according to the second embodiment corrects the position of the cutting blade 21 with respect to the workpiece 200 by the moving unit 40 on the basis of a change in the temperature of the spindle housing 25 which temperature is detected by the temperature detecting unit 70. Thus, the processing apparatus 1 can bring the cutting blade 21 close to a position set in the processing content information. The processing apparatus 1 can therefore suppress a decrease in processing accuracy more.

Third Embodiment

Figure 10:
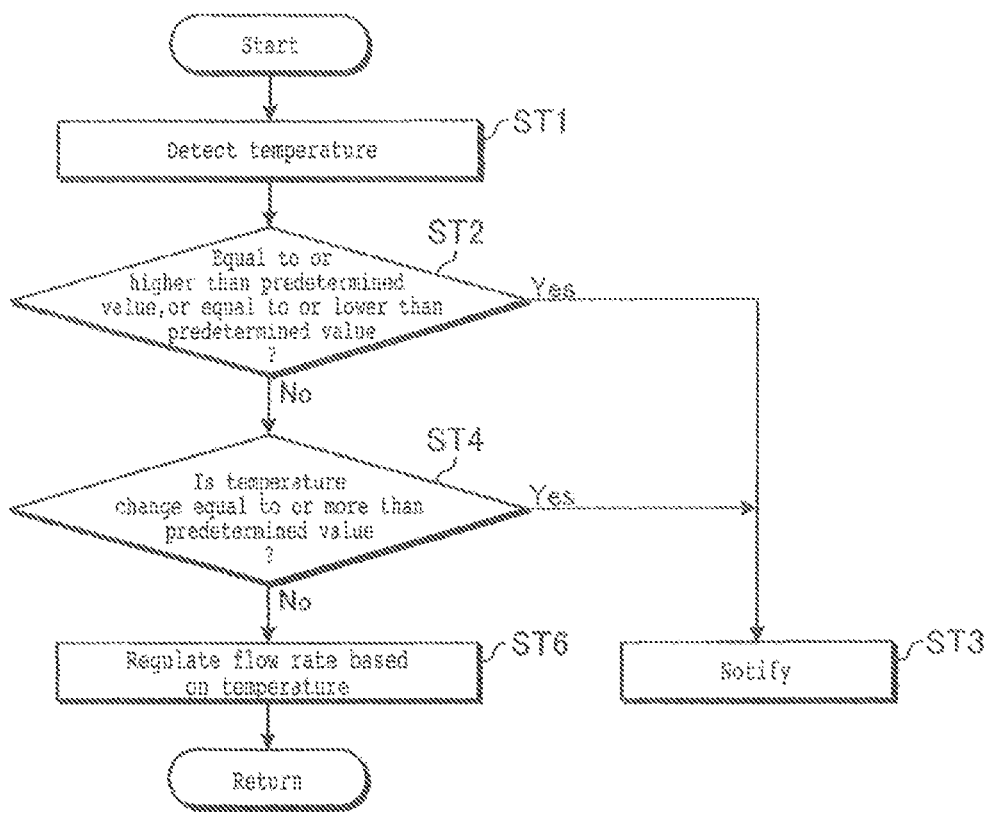
FIG. 10 is a flowchart showing a control operation repeatedly executed by the control unit of the processing apparatus according to the third embodiment during processing operation.

A processing apparatus according to a third embodiment of the present invention will be described with reference to drawings. FIG. 8 is a side view illustrating in partial section principal parts of a processing unit of the processing apparatus according to the third embodiment. FIG. 9 is a diagram illustrating an example of correction data stored by a control unit of the processing apparatus according to the third embodiment. FIG. 10 is a flowchart showing a control operation repeatedly executed by the control unit of the processing apparatus according to the third embodiment during processing operation. Incidentally, in FIG. 8 and FIG. 10, the same parts as in the first embodiment are identified by the same reference numerals, and description thereof will be omitted.

The processing apparatus 1 according to the third embodiment is the same as in the first embodiment except that, as illustrated in FIG. 8, the cooling unit 28 has a flow rate control valve 274 as a flow rate regulating unit (flow rate regulating means) between the opening and closing valve 271 and the cooling fluid passage 27, except that the control unit 100 stores, as processing content information, a reference temperature associated with information indicating the position in the Y-axis direction of each planned dividing line 203, a reference opening degree as an opening degree of the flow rate control valve 274, the reference opening degree being associated with the reference temperature, and correction data 400 illustrated in FIG. 9, and except that the control operation shown by the flowchart illustrated in FIG. 10 which control operation is repeatedly executed by the control unit 100 during the processing operation is partly different.

The flow rate control valve 274 is a valve that regulates the flow rate of the cooling water supplied from the cooling fluid supply source 272 to the cooling fluid passage 27. The reference temperature is a temperature of the spindle housing 25 at which temperature a desired position of each planned dividing line 203 can be cut when the cutting blade 21 is positioned according to information indicating the position in the Y-axis direction of each planned dividing line 203 which information is stored as the processing content information. The reference opening degree is an opening degree of the flow rate control valve 274 at which opening degree the temperature of the spindle housing 25 can be maintained at the reference temperature when the temperature of the spindle housing 25 is the reference temperature.

The correction data 400 illustrated in FIG. 9 is data obtained by associating, on a one-to-one basis, a temperature difference of the temperature of the spindle housing 25 which temperature is detected by the temperature detecting unit 70 from the reference temperature with a correction value for the opening degree of the flow rate control valve 274. The correction value indicates a difference between the reference opening degree stored as the processing content information and the opening degree of the flow rate control valve 274 which opening degree can bring the temperature of the spindle housing 25 close to the reference temperature. That is, the correction value is a value added to the reference opening degree stored as the processing content information in order to cut the desired position of each planned dividing line 203 when the spindle 22 expands or contracts due to a temperature change from the reference temperature. Incidentally, a minus sign of the correction value illustrated in FIG. 9 indicates a value that reduces the opening degree from the reference opening degree stored as the processing content information, and a plus sign of the correction value illustrated in FIG. 9 indicates a value that increases the opening degree from the reference opening degree.

The control unit 100 of the processing apparatus 1 according to the third embodiment repeatedly executes the control operation shown by the flowchart illustrated in FIG. 10 during the processing operation. When the control unit 100 determines that a change in the temperature of the spindle housing 25 which temperature is detected by the temperature detecting unit 70 and the like in the fixed time is not equal to or more than the third predetermined value (step ST4: No), the control unit 100 regulates the opening degree of the flow rate control valve 274 according to the correction data 400 illustrated in FIG. 9 on the basis of the temperature of the spindle housing 25 which temperature is detected by the temperature detecting unit 70, performs the processing operation (step ST6), and returns the control operation to step ST1.

Specifically, the control unit 100 refers to the correction data 400, obtains a temperature difference between the reference temperature and the temperature of the spindle housing 25 which temperature is detected by the temperature detecting unit 70, and extracts a correction value associated with the obtained temperature difference. Incidentally, when the obtained temperature difference is not set in the correction data 400, the control unit 100 may extract a correction value associated with a closest temperature difference, or may obtain a correction value from two correction values associated with two closest temperature differences. The control unit 100 performs the processing operation after correcting the opening degree of the flow rate control valve 274 to an opening degree obtained by adding the correction value to the reference opening degree stored as the processing content information.

Thus, in the third embodiment, the control unit 100 controls the flow rate control valve 274 on the basis of the temperature of the spindle housing 25 which temperature is detected by the temperature detecting unit 70.

The processing apparatus 1 according to the third embodiment includes the temperature detecting unit 70 that detects the temperature of the spindle housing 25, and determines whether the state of cooling of the spindle assembly 23 is normal or abnormal on the basis of the temperature detected by the temperature detecting unit 70. The processing apparatus 1 can therefore temporarily stop the processing operation when the cooling state is abnormal. Hence, the processing apparatus 1 can suppress a decrease in processing accuracy.

In addition, the processing apparatus 1 according to the third embodiment controls the flow rate control valve 274 on the basis of the temperature of the spindle housing 25 which temperature is detected by the temperature detecting unit 70. Thus, the processing apparatus 1 can bring the temperature of the spindle housing 25 close to the reference temperature, and bring the cutting blade 21 close to a position set in the processing content information. The processing apparatus 1 can therefore suppress a decrease in processing accuracy more.

Modifications

Figure 11:
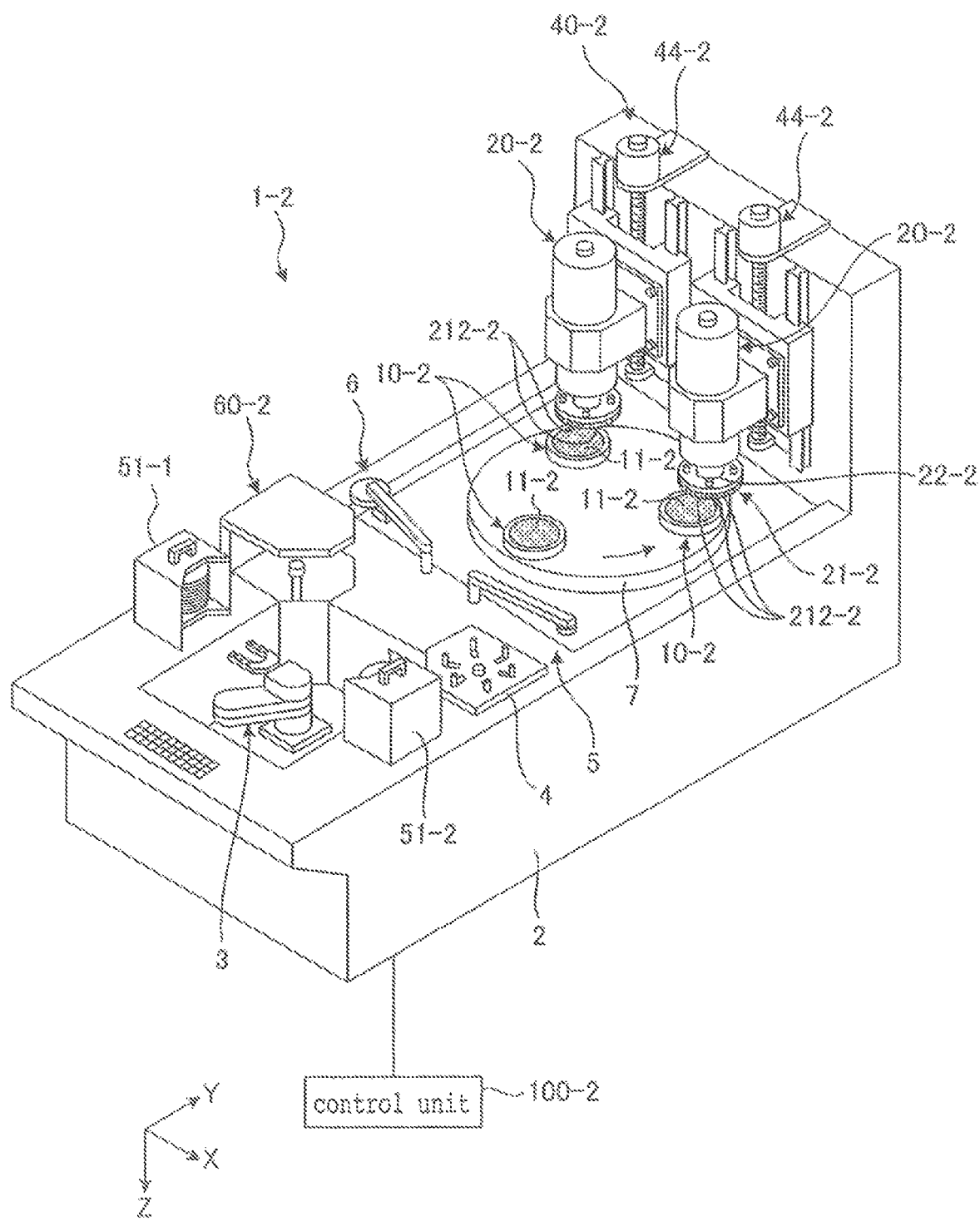
FIG. 11 is a perspective view illustrating an example of a configuration of a processing apparatus according to a modification of the first embodiment.
Figure 12:
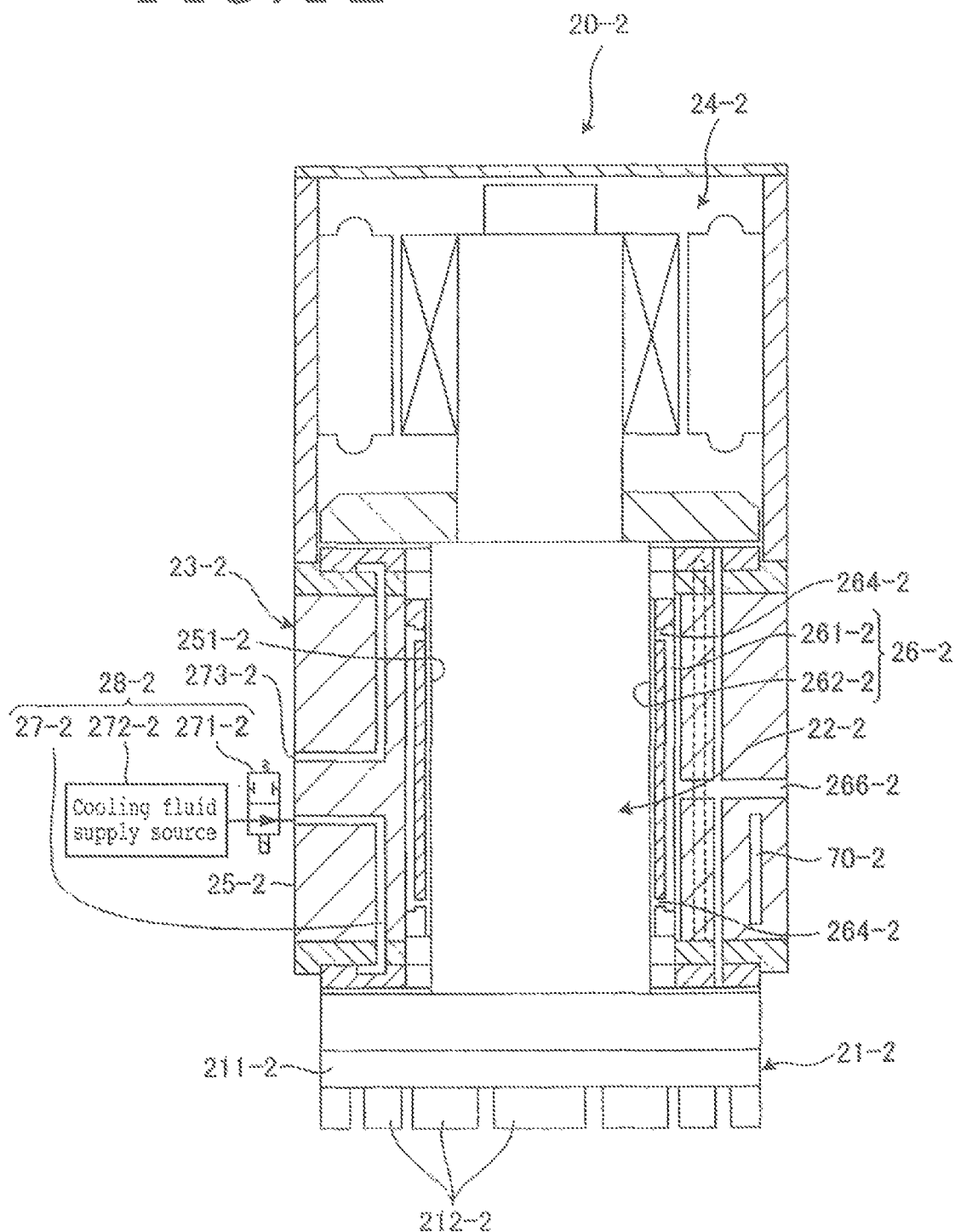
FIG. 12 is a side view illustrating in partial section a processing unit of the processing apparatus illustrated in FIG. 11.

A processing apparatus according to a modification of the first embodiment of the present invention will be described with reference to drawings. FIG. 11 is a perspective view illustrating an example of a configuration of the processing apparatus according to the modification of the first embodiment. FIG. 12 is a side view illustrating in partial section a processing unit of the processing apparatus illustrated in FIG. 11.

In the modification, the processing apparatus 1-2 is a grinding apparatus that performs grinding of the workpiece 200 (which grinding corresponds to processing). As illustrated in FIG. 11, the processing apparatus 1-2 includes an apparatus main body 2, a moving unit 40-2 as moving means, two processing units 20-2 as processing means for grinding the workpiece 200, three chuck tables 10-2, for example, installed on a turn table 7, cassettes 51-1 and 51-2, a positioning unit 4, a loading unit 5, an unloading unit 6, a cleaning unit 60-2, a loading and unloading unit 3, and a control unit 100-2 as control means for controlling at least the processing units 20-2.

The turn table 7 is a disk-shaped table disposed on an upper surface of the apparatus main body 2. The turn table 7 is disposed so as to be rotatable within a horizontal plane, and is rotation-driven in predetermined timing. On the turn table 7, the three chuck tables 10-2, for example, are arranged at equal intervals at a phase angle of 120 degrees, for example. These three chuck tables 10-2 are of a chuck table structure including a vacuum chuck under a holding surface 11-2, and suck and hold the front side surface 202 side of a workpiece 200 on the holding surface 11-2 via a protective tape not illustrated. These chuck tables 10-2 during grinding are rotation-driven within the horizontal plane by a rotation driving mechanism with an axis parallel with the vertical direction as a rotational axis. Such chuck tables 10-2 are sequentially moved by the rotation of the turn table 7 to a loading and unloading position separated from both of the two processing units 20-2, a rough grinding position below one processing unit 20-2, a finish grinding position below the other processing unit 20-2, and the loading and unloading position.

The processing units 20-2 are to grind the reverse side surface 205 of a workpiece 200 by pressing a grinding wheel 21-2 as a processing tool having a grinding stone 212-2 fitted to a lower end as a distal end of a spindle (shaft) 22-2 against the reverse side surface 205 of the workpiece 200 held on the chuck table 10-2 at the rough grinding position or the finish grinding position along the Z-axis direction parallel with the vertical direction while rotating the grinding wheel 21-2. Incidentally, in the modification, one processing unit 20-2 performs rough grinding of the workpiece 200, and the other processing unit 20-2 performs finish grinding of the workpiece 200.

As illustrated in FIG. 12, the processing units 20-2 include: a grinding wheel 21-2 that grinds the workpiece 200; and a spindle assembly 23-2. The grinding wheel 21-2 includes: a wheel base 211-2 fitted to the distal end of the spindle 22-2; and a plurality of grinding stones 212-2 fitted to the undersurface of the wheel base 211-2 and formed by fixing abrasive grains with a bonding agent.

The spindle assembly 23-2 includes: the spindle 22-2 having the grinding wheel 21-2 fitted to a lower end thereof; a spindle motor 24-2 that rotates the spindle 22-2 about an axis; and a spindle housing 25-2 that houses a part of the spindle 22-2 excluding the lower end of the spindle 22-2 and the spindle motor 24-2.

The spindle 22-2 is formed in a cylindrical shape. The spindle 22-2 is rotated about the axis by the spindle motor 24-2 disposed at a proximal end portion of the spindle 22-2. By being rotated about the axis by the spindle motor 24-2, the spindle 22-2 rotates the grinding wheel 21-2 fitted to the lower end of the spindle 22-2 to grind the workpiece 200.

The spindle housing 25-2 exposes the distal end of the spindle 22-2 and houses the part of the spindle 22-2 excluding the distal end of the spindle 22-2. The spindle 22-2 is thus inserted in the spindle housing 25-2. The spindle housing 25-2 is supported by a Z-axis moving unit 44-2 so as to be movable in the Z-axis direction.

The spindle housing 25-2 has an internally formed housing hole 251-2 housing the part of the spindle 22-2 excluding the distal end of the spindle 22-2, the housing hole 251-2 having a circular sectional shape orthogonal to the axis. The inside diameter of the housing hole 251-2 of the spindle housing 25-2 is larger than the outside diameter of the spindle 22-2. The spindle housing 25-2 includes an air bearing 26-2 that supports the spindle 22-2 rotatably about the axis.

The air bearing 26-2 is disposed on the outer circumferential side of the housing hole 251-2 and within the spindle housing 25-2, and includes an annular air supply passage 261-2 extending in the axial direction of the spindle housing 25-2, a radial air bearing 262-2, and a thrust air bearing not illustrated. The annular air supply passage 261-2 is supplied with a pressurized air from a pressurized air supply source on the outside of the spindle housing 25-2 through an air supply passage 266-2.

The radial air bearing 262-2 is formed by a plurality of radial branch passages 264-2 opening to the annular air supply passage 261-2 and the inner surface of the housing hole 251-2. The radial branch passages 264-2 are arranged at equal intervals in the axial direction and circumferential direction of the spindle housing 25-2, and extend in the radial direction of the spindle housing 25-2 from the annular air supply passage 261-2 to the inner surface of the housing hole 251-2. The radial air bearing 262-2, for example, jets the pressurized air supplied from the pressurized air supply source to the inner surface of the housing hole 251-2 through the radial branch passages 264-2. The air bearing 26-2 thereby supports the spindle 22-2 rotatably about the axis with respect to the spindle housing 25-2 by air.

In addition, a cooling fluid passage 27-2 surrounding the air bearing 26-2 is formed in the spindle housing 25-2. The cooling fluid passage 27-2 is disposed on the outer circumferential side of the annular air supply passage 261-2 of the air bearing 26-2 and within the spindle housing 25-2, and extends in the axial direction of the spindle housing 25-2. The cooling fluid passage 27-2 has one end connected to a cooling fluid supply source 272-2 supplying cooling water as a cooling fluid via an opening and closing valve 271-2, and has another end communicating with a cooling fluid outlet 273-2 opening to the external surface of the spindle housing 25-2. The cooling fluid passage 27-2 is supplied with the cooling water from the cooling fluid supply source 272-2 via the opening and closing valve 271-2, the cooling water is heated by heat generated in the spindle housing 25-2, and the heated cooling water is discharged from the cooling fluid outlet 273-2. The spindle assembly 23-2 is thereby cooled. Incidentally, the cooling fluid passage 27-2, the opening and closing valve 271-2, and the cooling fluid supply source 272-2 constitute a cooling unit 28-2 as cooling means for cooling the spindle assembly 23-2.

In addition, as illustrated in FIG. 12, the processing apparatus 1-2 includes a temperature detecting unit (temperature detecting means) 70-2. The temperature detecting unit 70-2 detects the temperature of the spindle housing 25-2. The temperature detecting unit 70-2 in the modification is a temperature detecting element that outputs a signal corresponding to the temperature of the spindle housing 25-2 to the control unit 100-2. The temperature detecting unit 70-2 in the modification is formed by a temperature detecting element such as a thermistor, a thermocouple, or the like. Incidentally, the thermistor outputs the above-described signal based on a change in an electric resistance value according to the temperature of the spindle housing 25-2 to the control unit 100-2. The thermocouple outputs a thermoelectromotive force corresponding to the temperature of the spindle housing 25-2 as the above-described signal to the control unit 100-2. In the modification, the temperature detecting unit 70-2 is disposed between the external surface of the spindle housing 25-2 and the cooling fluid passage 27-2 and close to the grinding wheel 21-2. However, in the present invention, the position in which the temperature detecting unit 70-2 is disposed is not limited to this, but the temperature detecting unit 70-2 may be disposed on the external surface of the spindle housing 25-2, for example. In addition, the temperature detecting unit 70-2 is preferably disposed in a position as close to the grinding wheel 21-2 as possible in the spindle housing 25-2.

Incidentally, the axes of the grinding wheel 21-2, the spindle 22-2, and the spindle housing 25-2 of the processing unit 20-2 are set parallel with the Z-axis direction.

The moving unit 40-2 is moving means for moving the grinding wheel 21-2 with respect to the workpiece 200. The moving unit 40-2 includes at least the Z-axis moving unit 44-2 that moves the processing unit 20-2 with respect to the chuck table 10-2 in the Z-axis direction parallel with the vertical direction. The Z-axis moving unit 44-2 is associated with the processing unit 20-2 on a one-to-one basis. The Z-axis moving unit 44-2 moves the associated processing unit 20-2 in the Z-axis direction. The Z-axis moving unit 44-2 includes a well-known ball screw provided rotatably about an axis, a well-known motor rotating the ball screw about the axis, and well-known guide rails supporting the processing unit 20-2 movably in the Z-axis direction.

In addition, the processing apparatus 1-2 includes a Z-axis direction position detecting unit for detecting the position in the Z-axis direction of the processing unit 20-2. The Z-axis direction position detecting unit outputs the position in the Z-axis direction of the processing unit 20-2 to the control unit 100-2.

The cassettes 51-1 and 51-2 are containers for housing a plurality of workpieces 200. One cassette 51-1 houses workpieces 200 before grinding. The other cassette 51-2 houses workpieces 200 after grinding. In addition, the positioning unit 4 is a table for temporarily placing a workpiece 200 extracted from the cassette 51-1 and centering the workpiece 200.

The loading unit 5 has a suction pad. The loading unit 5 sucks and holds the workpiece 200 before grinding which workpiece 200 is positioned by the positioning unit 4, and loads the workpiece 200 onto the chuck table 10-2 located at the loading and unloading position. The unloading unit 6 sucks and holds the workpiece 200 after grinding which workpiece 200 is held on the chuck table 10-2 located at the loading and unloading position, and unloads the workpiece 200 into the cleaning unit 60-2.

The loading and unloading unit 3 is, for example, a robotic pick having a U-shaped hand. The loading and unloading unit 3 sucks and holds the workpiece 200 and transfers the workpiece 200 by the U-shaped hand. Specifically, the loading and unloading unit 3 unloads the workpiece 200 before grinding from the cassette 51-1 onto the positioning unit 4, and loads the workpiece 200 after the grinding from the cleaning unit 60-2 into the cassette 51-2.

The cleaning unit 60-2 cleans the workpiece 200 after the grinding, and thereby removes a contamination such as grinding swarf, polishing swarf, or the like adhering to a processed surface resulting from the grinding.

The control unit 100-2 controls each of the above-described constituent elements constituting the processing apparatus 1-2. That is, the control unit 100-2 makes the processing apparatus 1-2 perform grinding operation on the workpiece 200. The control unit 100-2 is a computer capable of executing a computer program. The control unit includes an arithmetic processing apparatus having a microprocessor such as a CPU, a storage apparatus having a memory such as a ROM, a RAM, or the like, and an input-output interface apparatus. The arithmetic processing apparatus of the control unit 100-2 generates a control signal for controlling the processing apparatus 1-2 by executing a computer program stored in the storage apparatus. The arithmetic processing apparatus of the control unit 100-2 outputs the generated control signal to each of the constituent elements of the processing apparatus 1-2 via the input-output interface apparatus. In addition, as in the first embodiment, the control unit 100-2 is connected with an input unit, a display unit, and a notifying unit 80.

As in the processing apparatus 1 according to the first embodiment, the control unit 100-2 of the processing apparatus 1-2 according to the modification repeatedly executes the control operation shown by the flowchart illustrated in FIG. 5 during processing operation.

The processing apparatus 1-2 according to the modification includes the temperature detecting unit 70-2 that detects the temperature of the spindle housing 25-2, and determines whether the state of cooling of the spindle assembly 23-2 is normal or abnormal on the basis of the temperature detected by the temperature detecting unit 70-2. The processing apparatus 1-2 can therefore temporarily stop the processing operation when the cooling state is abnormal. Hence, the processing apparatus 1-2 can suppress a decrease in processing accuracy.

Incidentally, while the processing apparatus 1-2 according to the modification repeatedly executes the control operation shown by the flowchart illustrated in FIG. 5 during the processing operation, the processing apparatus 1-2 in the present invention may repeatedly execute the control operation shown by the flowchart illustrated in FIG. 7 or the control operation shown by the flowchart illustrated in FIG. 10 as in the second embodiment and the third embodiment.

It is to be noted that the present invention is not limited to the foregoing embodiments and the like. That is, the present invention can be variously modified and carried out without departing from the gist of the present invention. It is to be noted that while a cutting apparatus is illustrated as the processing apparatus 1 in the first to third embodiments, and a grinding apparatus is illustrated as the processing apparatus 1-2 in the modification, the present invention is not limited to these, but the processing apparatus may be various kinds of processing apparatuses such as a polishing apparatus, a bit cutting apparatus, and the like. In addition, while the processing apparatus 1 performs both step ST2 and step ST4 in the first to third embodiments, the present invention is not limited to this, but the processing apparatus may perform one of step ST2 and step ST4.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:
a processing unit configured to process a workpiece;
a control unit configured to control the processing unit; and
a temperature detecting unit;
the processing unit including:
a processing tool configured to process the workpiece, and
a spindle assembly including a spindle having the processing tool mounted on a distal end of the spindle and a spindle housing through which the spindle is inserted, the spindle housing having an air bearing configured to support the spindle by air,
a cooling fluid passage being formed in the spindle housing, the cooling fluid passage surrounding the air bearing and cooling the spindle assembly, the cooling fluid passage having one end connected to a cooling fluid supply source and having another end communicating with a cooling fluid outlet of the spindle housing,
the temperature detecting unit detecting a temperature of the spindle housing,
the control unit determining whether a state of cooling of the spindle assembly is normal or abnormal on a basis of the temperature detected by the temperature detecting unit,
wherein the control unit determines that the state of cooling of the spindle assembly is abnormal when the temperature of the spindle housing being detected by the temperature detecting unit is equal to or higher than a first predetermined value; and wherein the control unit determines that the state of cooling of the spindle assembly is abnormal when the temperature of the spindle housing being detected by the temperature detecting unit is equal to or lower than a second predetermined value, the second predetermined value being lower than the first predetermined value; and wherein the control unit determines that the state of cooling of the spindle assembly is abnormal when a change in the temperature of the spindle housing being detected by the temperature detecting unit in a fixed time is equal to or more than a third predetermined value the third predetermined value being a predetermined value of the change in temperature of the spindle housing in the fixed time; and
the control unit temporarily stopping operation of the processing unit in response to a determination that the state of cooling of the spindle assembly is abnormal, and the control unit continuing operation of the processing unit in response to a determination that the state of cooling of the spindle assembly is not abnormal.

2. The processing apparatus according to claim 1, further comprising:
a moving unit configured to move the processing tool with respect to the workpiece,
wherein the control unit corrects a position of the processing tool with respect to the workpiece by the moving unit on a basis of a change in the temperature of the spindle housing, the temperature being detected by the temperature detecting unit.

3. The processing apparatus according to claim 1, further comprising:
a flow rate regulating unit configured to regulate a flow rate of a cooling fluid supplied from the cooling fluid supply source, wherein the control unit controls the flow rate regulating unit on a basis of the temperature of the spindle housing, the temperature being detected by the temperature detecting unit.

4. The processing apparatus according to claim 1 wherein the first predetermined value is 30° C.

5. The processing apparatus according to claim 1 wherein the second predetermined value is 15° C.

6. The processing apparatus according to claim 1 wherein the third predetermined value is 1° C. and the fixed time is 1 minute.

7. The processing apparatus according to claim 1 further comprising:
   lighting a lamp when the state of cooling of the spindle assembly is abnormal.

8. The processing apparatus according to claim 1 further comprising:
   making a display on a display unit when the state of cooling of the spindle assembly is abnormal.

* * * * *